(12) United States Patent
Liu et al.

(10) Patent No.: US 11,801,534 B2
(45) Date of Patent: Oct. 31, 2023

(54) FRUIT QUALITY INSPECTING AND SORTING APPLIANCE

(71) Applicant: EAST CHINA JIAO TONG UNIVERSITY, Jiangxi (CN)

(72) Inventors: Yande Liu, Jiangxi (CN); Jun Hu, Jiangxi (CN); Junzheng Wang, Jiangxi (CN); Siyi Ouyang, Jiangxi (CN); Yunjuan Yan, Jiangxi (CN); Huizheng Cui, Jiangxi (CN); Xiaogang Jiang, Jiangxi (CN); Jian Wu, Jiangxi (CN); Xuan Hu, Jiangxi (CN); Aiguo Ouyang, Jiangxi (CN)

(73) Assignee: EAST CHINA JIAO TONG UNIVERSITY, Jiangxi (CN)

( * ) Notice: Subject to any disclaimer, the term of this patent is extended or adjusted under 35 U.S.C. 154(b) by 0 days.

(21) Appl. No.: 17/619,237

(22) PCT Filed: Sep. 3, 2020

(86) PCT No.: PCT/CN2020/113324
§ 371 (c)(1),
(2) Date: Dec. 14, 2021

(87) PCT Pub. No.: WO2022/047712
PCT Pub. Date: Mar. 10, 2022

(65) Prior Publication Data
US 2023/0182174 A1    Jun. 15, 2023

(51) Int. Cl.
*B07C 5/342* (2006.01)
*B07C 5/28* (2006.01)
(Continued)

(52) U.S. Cl.
CPC .............. *B07C 5/3422* (2013.01); *B07C 5/28* (2013.01); *B07C 5/362* (2013.01); *B25J 9/1612* (2013.01);
(Continued)

(58) Field of Classification Search
CPC .. B07C 5/28; B07C 5/34; B07C 5/342; B07C 5/3422; B07C 2501/0063; B65G 15/50
(Continued)

(56) References Cited

U.S. PATENT DOCUMENTS 5,309,374 A * 5/1994 Misra ................. G01N 15/0227
702/81

FOREIGN PATENT DOCUMENTS

CN        202092599 U        12/2011
CN        104237547 A   *    12/2014
(Continued)

OTHER PUBLICATIONS

International Search Report for corresponding application PCT/CN2020/113324 filed Sep. 3, 2020; dated May 31, 2021.

*Primary Examiner* — Terrell H Matthews
(74) *Attorney, Agent, or Firm* — Gang Yu

(57) ABSTRACT

Provided is a fruit quality inspecting and sorting appliance. The fruit quality inspecting and sorting appliance includes: a conveying module; a weighing module, which cooperates with the conveying module to convey weighed fruits through the conveying module; an internal quality inspection module, which cooperates with the conveying module and performs an internal quality inspection to the weighed fruits; an external quality inspection module, which cooperates with the conveying module and performs an external quality inspection to the fruits after the internal quality inspection; a sorting module, which cooperates with the conveying module, and sorts the fruits passing through the
(Continued)

weighing module, the internal quality inspection module and the external quality inspection module; and a control module electrically connected with the conveying module, the weighing module, the internal quality inspection module, the external quality inspection module and the sorting module.

10 Claims, 8 Drawing Sheets

(51) Int. Cl.
*B07C 5/36* (2006.01)
*B25J 9/16* (2006.01)
*B65G 15/50* (2006.01)
*B65G 53/44* (2006.01)
*B65G 65/23* (2006.01)

(52) U.S. Cl.
CPC ............. *B65G 15/50* (2013.01); *B65G 53/44* (2013.01); *B65G 65/23* (2013.01); *B07C 2501/0063* (2013.01)

(58) Field of Classification Search
USPC .......................................................... 209/552
See application file for complete search history.

(56) References Cited

FOREIGN PATENT DOCUMENTS

| | | | | |
|---|---|---|---|---|
| CN | 104237547 | A | 12/2014 | |
| CN | 108906653 | A | 11/2018 | |
| CN | 208033066 | U | 11/2018 | |
| CN | 208340999 | U | 1/2019 | |
| FR | 2775204 | A1 * | 8/1999 | ............... B07C 5/34 |
| JP | 2007313470 | A | 12/2007 | |
| JP | 2012008098 | A * | 1/2012 | |
| JP | 2015003284 | A * | 1/2015 | |
| JP | 2018079421 | A * | 5/2018 | |
| WO | WO-9104803 | A1 * | 9/1990 | |
| WO | 9104803 | A1 | 4/1991 | |
| WO | WO-9104803 | A1 * | 4/1991 | |
| WO | WO-02074457 | A1 * | 9/2002 | ............. B07C 5/342 |
| WO | WO-2022047712 | A1 * | 3/2022 | ............... B07C 5/28 |

\* cited by examiner

FRUIT QUALITY INSPECTING AND SORTING APPLIANCE

TECHNICAL FIELD

The disclosure relates to the technical field of a fruit quality inspecting appliance, in particular to a fruit quality inspecting and sorting appliance.

BACKGROUND

Fruit has advantages of being quite common, high nutritional value and being very important in daily life. Some consumers like to eat sweet fruits, some consumers like to eat fruits with a sour taste, some consumers like large fruits, and some consumers prefer medium sized fruits or even small fruits. For different needs of different consumers, fruit farmers also want their fruit to be finely sorted. Fine sorting of fruit is more conducive to product sales and profit.

In an art known to inventors, fine sorting of fruit is usually carried out by manual screening, for example, fruits are sorted by manually observing appearances, sizes and other qualities. Such a sorting method is time-consuming and laborious.

SUMMARY

Some embodiments of the disclosure provide a fruit quality inspecting and sorting appliance, so as to solve a problem in an art known to inventors that sorting fruits is time-consuming and laborious.

Some embodiments of the disclosure provide a fruit quality inspecting and sorting appliance. The fruit quality inspecting and sorting appliance includes: a conveying module; a weighing module, which cooperates with the conveying module to convey weighed fruits through the conveying module; an internal quality inspection module, which cooperates with the conveying module and performs an internal quality inspection to the weighed fruits; an external quality inspection module, which cooperates with the conveying module and performs an external quality inspection to the fruits after the internal quality inspection; a sorting module, wherein the sorting module cooperates with the conveying module, and sorts the fruits passing through the weighing module, the internal quality inspection module and the external quality inspection module; and a control module, wherein the control module is electrically connected with the conveying module, the weighing module, the internal quality inspection module, the external quality inspection module and the sorting module respectively, and controls the sorting module to sort the fruits according to an inspection result of the fruits.

In some embodiments, the conveying module includes a support structure, a middle conveyor-belt structure and two side conveyor-belt structures, the middle conveyor-belt structure is arranged on the support structure, the two side conveyor-belt structures are located on the support structure and on two sides of the middle conveyor-belt structure, a conveying direction of the two side conveyor-belt structures is opposite to a conveying direction of the middle conveyor-belt structure.

In some embodiments, the weighing module includes a weighing support, a first weighing main body structure and a second weighing main body structure, the first weighing main body structure and the second weighing main body structure are arranged on the weighing support, the weighing support spans a first end of the conveying module, the first weighing main body structure and the second weighing main body structure are the same and symmetrically arranged on two sides of the conveying module.

In some embodiments, the first weighing main body structure includes a first weighing loading conveyor belt, a first weighing grasping manipulator and a first weighing cup, the first weighing loading conveyor belt, the first weighing grabbing manipulator and the first weighing cup are all arranged on the weighing support, the first weighing grasping manipulator includes a first moving structure and a first fruit suction disc structure, the first fruit suction disc structure is arranged on the first moving structure.

In some embodiments, the fruit suction disc structure includes a negative pressure suction device and a plurality of suction discs, the plurality of suction discs are arranged on the moving structure at intervals and connected with the negative pressure suction device.

In some embodiments, the first weighing main body structure also includes a first box pushing and pulling structure, a first separator suction disc structure, a first discharging conveyor belt and a first box pushing structure, the first box pushing and pulling structure is arranged on the weighing support and is configured to drive a fruit box to move along a moving direction of the side conveyor-belt structure, the first separator suction disc structure is arranged on the weighing support and is configured to grasp a separator in the fruit box, the first box pushing structure is arranged corresponding to the first discharging conveyor belt.

In some embodiments, the internal quality inspection module includes an internal quality inspection housing, a halogen lamp and an optical fiber, the conveying module passes through the internal quality inspection housing, the halogen lamp is located above the side conveyor-belt structure, the optical fiber is located below the side conveyor-belt structure and is electrically connected with the control module.

In some embodiments, the external quality inspection module includes an external quality inspection housing, a fluorescent lamp and a camera, the conveying module passes through the external quality inspection housing, the fluorescent lamp is located above the side conveyor-belt structure, the camera is located above the side conveyor-belt structure.

In some embodiments, the sorting module includes a plurality of sorting channels and a plurality of fruit unloading manipulators, the plurality of sorting channels are arranged at intervals on a side, away from the middle conveyor-belt structure, of the side conveyor-belt structure, the plurality of fruit unloading manipulators and the plurality of sorting channels are arranged in one-to-one correspondence.

In some embodiments, the fruit quality inspecting and sorting appliance includes a fruit cup structure. The fruit cup structure includes a base, a fruit cup and a fruit cup handle, a side, close to the sorting channel, of the fruit cup is pivotally connected with the base through a hinge, the fruit cup handle is arranged on a side, away from the sorting channel, of the fruit cup, the fruit unloading manipulator cooperates with the fruit cup handle to flip the fruit cup.

In some embodiments, the fruit unloading manipulator includes a cylinder, a lifting plate and a pressing plate, the lifting plate and the pressing plate are arranged at intervals on a moving rod of the cylinder, the lifting plate is located at a lower part of the fruit cup handle, the pressing plate is located at an upper part of the fruit cup handle.

By applying the technical solution of some embodiments of the disclosure, fruits are weighed through the weighing module, and a measurement result of the weighed fruits is transmitted to the control module. The weighed fruits are conveyed, through the conveying module, to the internal quality inspection module for internal quality inspection, and a result of internal quality inspection is also transmitted to the control module. The fruits after internal quality inspection are conveyed, through the conveying module, to the external quality inspection module, and an inspection result of the external quality inspection module is also transmitted to the control module. The fruits passing through the external quality inspection module are conveyed to the sorting module through the conveying module. The control module combines inspection results of the weighing module, the internal quality inspection module and the external quality inspection module, and sorts the fruits according to a preset program preset in the control module. The above structure realizes automatic screening of fruits, greatly reduces labor intensity, and improves working efficiency. The technical solution of some embodiments of the disclosure effectively solves the problem in the art that sorting fruits is time-consuming and laborious.

BRIEF DESCRIPTION OF THE DRAWINGS

The accompanying drawings constituting a part of the present disclosure are used for providing further understanding of the present disclosure. Schematic embodiments of the present disclosure and description thereof are used for illustrating the present disclosure and not intended to form an improper limit to the present disclosure. In the accompanying drawings.

Figure 1:
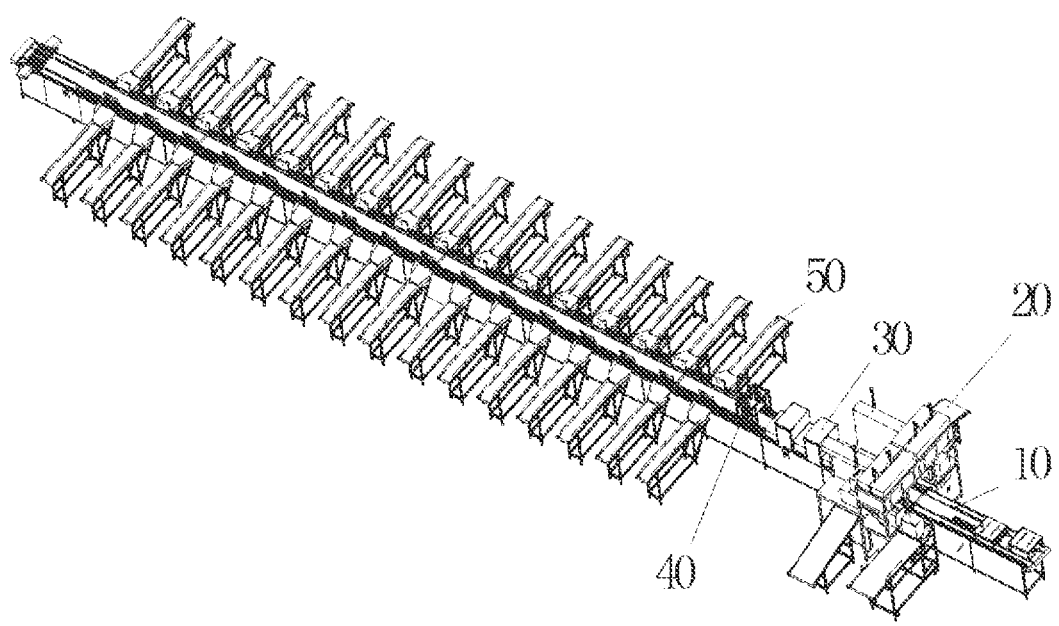
FIG. 1 is a flowchart of an embodiment of a fruit quality inspecting and sorting appliance according to the disclosure.

The above accompanying drawings include the following reference numbers:

10 represents a conveying module; 11 represents a support structure; 12 represents a middle conveyor-belt structure; 13 represents a side conveyor-belt structure; 20 represents a weighing module; 21 represents a weighing support; 206 represents a fruit box pushing cylinder; 214 represents a fruit box placing platform; 216 represents an LCD touch screen; 22 represents a first weighing main body structure; 221 represents a first weighing loading conveyor belt; 222 represents a first weighing grasping manipulator; 223 represents a first weighing cup; 224 represents a first discharging conveyor belt; 225 represents a first box pushing structure; 23 represents a second weighing main body structure; 30 represents an internal quality inspection module; 31 represents an internal quality inspection housing; 32 represents a halogen lamp; 33 represents an optical fiber; 40 represents an external quality inspection module; 41 represents an external quality inspection housing; 42 represents a fluorescent lamp; 43 represents a camera; 50 represents a sorting module; 51 represents a sorting channel; 52 represents a fruit unloading manipulator; 521 represents a cylinder; 522 represents a lifting plate; 523 represents a pressing plate; 60 represents a fruit cup structure; 61 represents a base; 62 represents a fruit cup; and 63 represents a fruit cup handle.

DETAILED DESCRIPTION OF THE EMBODIMENTS

It is to be noted that the embodiments in the present disclosure and characteristics in the embodiments may be combined without conflicts. The present disclosure is elaborated below with reference to the accompanying drawings and embodiments.

It should be noted that the following detailed description is illustrative and is intended to provide a further description of the present disclosure. Unless otherwise indicated, all technical and scientific terms used herein have the same meaning as that commonly understood by those of ordinary skill in the art to which the present disclosure belongs.

For convenient description, spatially relativity terms such as "on", "above", "on the surface of", "on the top of" may be used herein to describe the spatial positional relationship of one device or one feature to other devices or features as shown in the drawings. It will be understood that the spatially relativity terms are intended to encompass different orientations used or operated in addition to the orientations of the devices described in the drawings. For example, if the device in the drawings is inverted, the device described as "on other devices or configurations" or "above other devices or configurations" will then be positioned "under other devices or configurations" or "below other devices or configurations." Thus, the exemplary term "above" may include both orientations of "above" and "below". The device may also be positioned in other different ways (rotated 90° or at other orientations) and the spatially relativity description used herein is interpreted accordingly.

Exemplary embodiments according to the disclosure will now be described in more detail with reference to the accompanying drawings. However, the exemplary embodiments may be implemented in many different forms and should not be construed as being only limited to the embodiments set forth herein. It is to be understood that the embodiments are provided so that the disclosure of the present disclosure may be thorough and complete, and the concept of the exemplary embodiments may be fully conveyed to those of ordinary skill in the art. In the drawings, for clarity, the thicknesses of layers and regions are enlarged, and the same reference numerals are used to denote the same devices, and thus the description thereof is omitted.

As shown in FIG. 1 to FIG. 11, a fruit quality inspecting and sorting appliance of the embodiments includes: a conveying module 10, a weighing module 20, an internal quality inspection module 30, an external quality inspection module 40, a sorting module 50 and a control module. The weighing module 20 cooperates with the conveying module 10 to convey weighed fruits through the conveying module 10. The internal quality inspection module 30 cooperates with the conveying module 10 and performs an internal quality inspection to the weighed fruits. The external quality inspection module 40 cooperates with the conveying module 10 and performs an external quality inspection to the fruits after the internal quality inspection. The sorting module 50 cooperates with the conveying module 10, and sorts the fruits passing through the weighing module 20, the internal quality inspection module 30 and the external quality inspection module 40. The control module is electrically connected with the conveying module 10, the weighing module 20, the internal quality inspection module 30, the external quality inspection module 40 and the sorting module 50, and controls the sorting module 50 to sort the fruits according to an inspection result of the fruits.

By applying the technical solution of the embodiments, fruits are weighed through the weighing module 20, and a measurement result of the weighed fruits is transmitted to the control module. The weighed fruits are conveyed, through the conveying module 10, to the internal quality inspection module 30 for the internal quality inspection, and a result of the internal quality inspection is also transmitted to the control module. The fruits after internal quality inspection are conveyed, through the conveying module 10, to the external quality inspection module 40, and an inspection result of the external quality inspection module 40 is also transmitted to the control module. The fruits passing through the external quality inspection module 40 are conveyed to the sorting module 50 through the conveying module 10. The control module combines inspection results of the weighing module 20, the internal quality inspection module 30 and the external quality inspection module 40, and sorts the fruits according to a preset program preset in the control module. The above structure realizes automatic screening of fruits, greatly reduces labor intensity, and improves working efficiency. The technical solution of some embodiments of the disclosure effectively solves a problem in an art known to inventors that sorting fruits is time-consuming and laborious.

It is to be noted that, taking apples as an example, the internal quality inspection module 30 may inspect a sweetness of apples. The program preset in the control module is set as required. For example, the fruits with high quality, high sweetness and no damage in appearance are in the first category, the fruits with medium quality, high sweetness and no damage in appearance are in the second category, the fruits with low quality, high sweetness and no damage in appearance are in the third category, the fruits with high quality, medium sweetness and no damage in appearance are in the fourth category, and so on.

As shown in FIG. 1 to FIG. 4, in the technical solution of some embodiments, the conveying module 10 includes a support structure 11, a middle conveyor-belt structure 12 and two side conveyor-belt structures 13. The middle conveyor-belt structure 12 is arranged on the support structure 11. The two side conveyor-belt structures 13 are located on the support structure 11 and on two sides of the middle conveyor-belt structure 12 respectively. A conveying direction of the two side conveyor-belt structures 13 is opposite to a conveying direction of the middle conveyor-belt structure.

The above fruit conveying requires a fruit cup. The side conveyor-belt structure 13 conveys fruits in the fruit cup forward. After the fruits in the fruit cup are sorted and dumped, the fruit cup is conveyed back through the middle conveyor-belt structure 12. The two side conveyor-belt structures 13 greatly improve a conveying efficiency. The side conveyor-belt structures 13 are located on two ends of the middle conveyor-belt structure 12. On the one hand, it is easy to dump the fruits on the side conveyor-belt structure 13 and easy to set the sorting module 50, on the other hand, the structure is compact and the processing cost is low. It is to be noted that all of the weighing module 20, the internal quality inspection module 30, the external quality inspection module 40 and the sorting module 50 may operate the fruits on the two side conveyor-belt structures 13 simultaneously.

Figure 2:
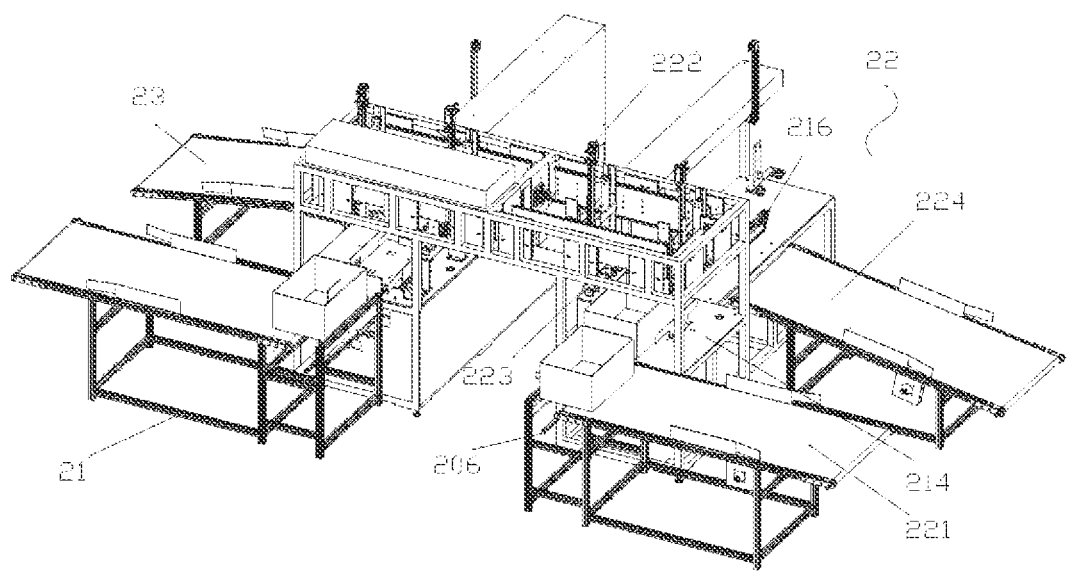
FIG. 2 is a structural schematic diagram of a weighing module of the fruit quality inspecting and sorting appliance in FIG. 1.

As shown in FIG. 2, in the technical solution of some embodiments, the weighing module 20 includes a weighing support 21, a first weighing main body structure 22 and a second weighing main body structure 23. The first weighing main body structure 22 and the second weighing main body structure 23 are arranged on the weighing support 21. The weighing support 21 spans a first end of the conveying module 10. The first weighing main body structure 22 and the second weighing main body structure 23 are the same and symmetrically arranged on two sides of the conveying module 10. The above structure has high weighing efficiency and compact structure, and saves cost.

As shown in FIG. 2, in the technical solution of some embodiments, the first weighing main body structure 22 includes a first weighing loading conveyor belt 221, a first weighing grasping manipulator 222 and a first weighing cup 223. The first weighing loading conveyor belt 221, the first weighing grabbing manipulator 222 and the first weighing cup 223 are all arranged on the weighing support 21. The first weighing grasping manipulator 222 includes a first moving structure and a first fruit suction disc structure. The first fruit suction disc structure is arranged on the first moving structure. The production cost of the above structure is low. It is to be noted that the second weighing main body structure 23 also includes a second weighing loading conveyor belt, a second weighing grasping manipulator and a second weighing cup. The first moving structure includes a first horizontal moving structure, a second horizontal moving structure and a vertical moving structure. Moving directions of the first horizontal moving structure and the second horizontal moving structure are horizontal and perpendicular to each other. The moving direction of the first horizontal moving structure is a moving direction along the side conveyor-belt structure 13. The moving direction of the second horizontal moving structure is perpendicular to the moving direction of the side conveyor-belt structure 13. The vertical moving structure moves in a vertical direction. The first horizontal moving structure, the second horizontal moving structure and the vertical moving structure may be motor screw drive structure, cylinder structure, hydraulic structure or electric push rod structure. The second weighing grasping manipulator includes a second moving structure and a second fruit suction disc structure.

As shown in FIG. 2, in the technical solution of some embodiments, the fruit suction disc structure includes a negative pressure suction device and a plurality of suction discs. The plurality of suction discs are arranged on the moving structure at intervals and connected with the negative pressure suction device. The suction disc structure with the above structure is not easy to damage the fruit. The suction disc is made of elastic and cushioning materials such as rubber or silica gel. The structure of multiple suction discs greatly improves the weighing efficiency. Of course, there are also multiple weighing fruit cups, and cushions made of flexible materials are provided in the multiple weighing fruit cups. The suction disc structure also includes a pressure sensor and a negative pressure sensor. Both the pressure sensor and negative pressure sensor are electrically connected with the control module. When the pressure sensor detects that a pressure reaches at a predetermined value, the suction disc stops moving downward, and the negative pressure suction device sucks a negative pressure. When it is detected that the negative pressure reaches a predetermined value, sucking the negative pressure is stopped, so that the fruit can be lifted. In some embodiments, the suction disc may also move downward, while the negative pressure suction device sucks the negative pressure.

Figure 3:
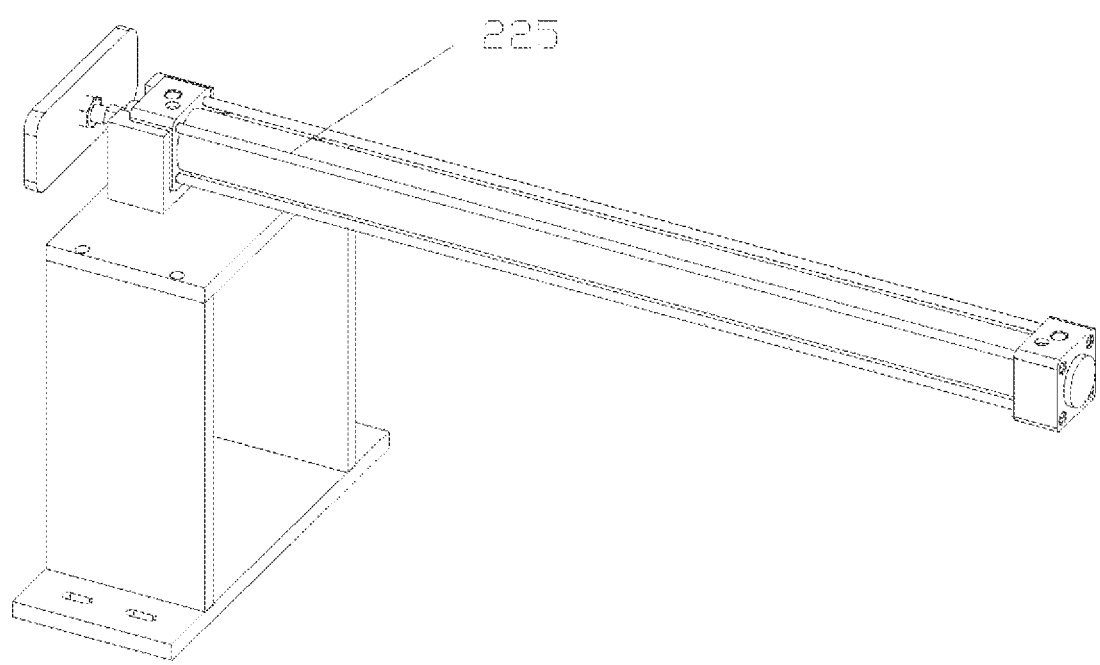
FIG. 3 is a structural schematic diagram of a first box pushing structure of the weighing module in FIG. 2.
Figure 4:
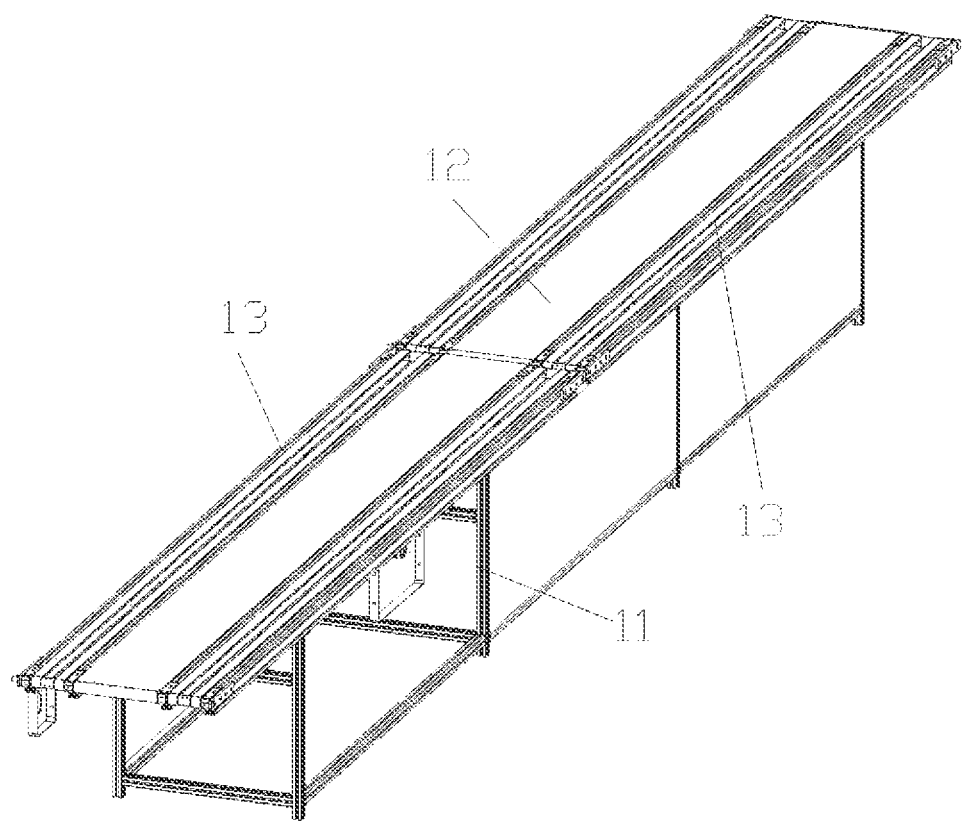
FIG. 4 is a structural schematic diagram of a conveying module of the fruit quality inspecting and sorting appliance in FIG. 1.
Figure 5:
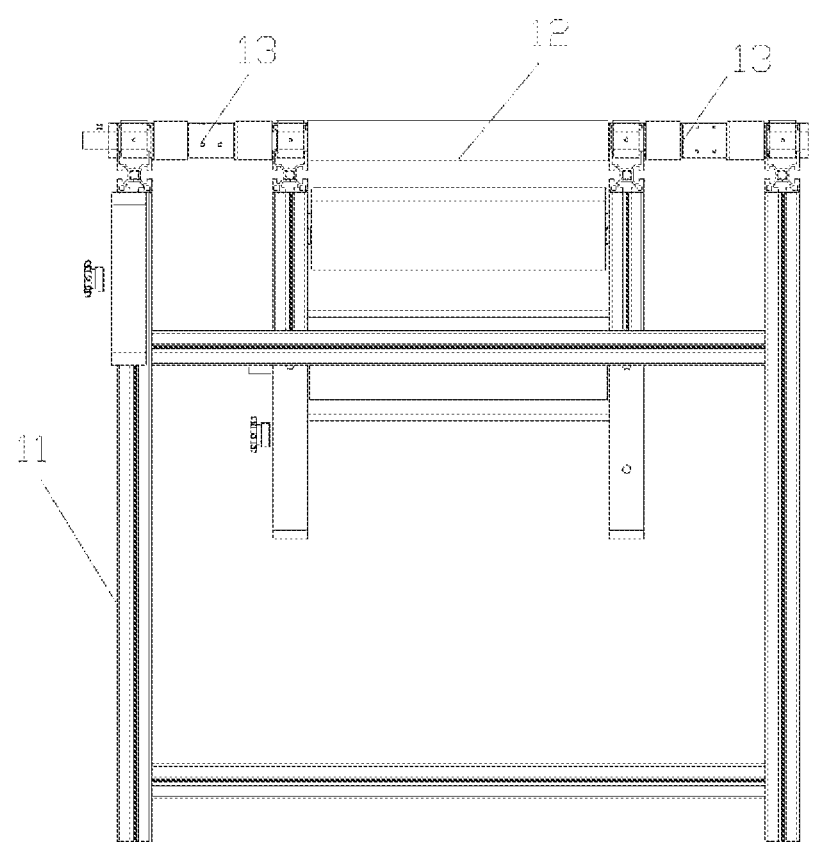
FIG. 5 is a structural schematic diagram of another angle of the conveying module in FIG. 1.

As shown in FIG. 2 and FIG. 3, in the technical solution of some embodiments, the first weighing main body structure 22 also includes a first box pushing and pulling structure, a first separator suction disc structure, a first discharging conveyor belt 224 and a first box pushing structure 225. The first box pushing and pulling structure is arranged on the weighing support 21 and is configured to drive a fruit box to move along a moving direction of the side conveyor-belt structure 13. The first separator suction disc structure is arranged on the weighing support 21 and is configured to grasp a separator in the fruit box. The first box pushing structure 225 is arranged corresponding to the first discharging conveyor belt 224. The above structure further improves an intelligence degree of the fruit quality inspecting and sorting appliance without needing to take the separator manually. The fruit quality inspecting and sorting appliance of the embodiments may be set according to the number of fruits in each layer of the fruit box. For example, for 4×5 fruits in each layer, the first box pushing and pulling structure pushes the fruit box to the first separator suction disc structure after 20 fruits are grasped, and pulls the fruit box back after the separator is absorbed. The second weighing main body structure 23 also includes a second box pushing and pulling structure, a second separator suction disc structure, a second discharging conveyor belt and a second box pushing structure.

Figure 6:
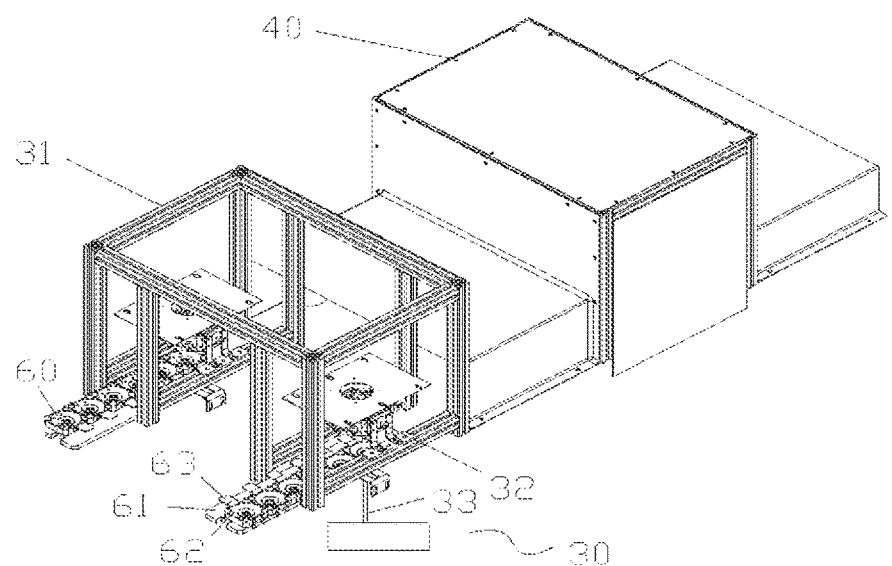
FIG. 6 is a structural schematic diagram of an internal quality inspection module of the fruit quality inspecting and sorting appliance in FIG. 1.
Figure 11:
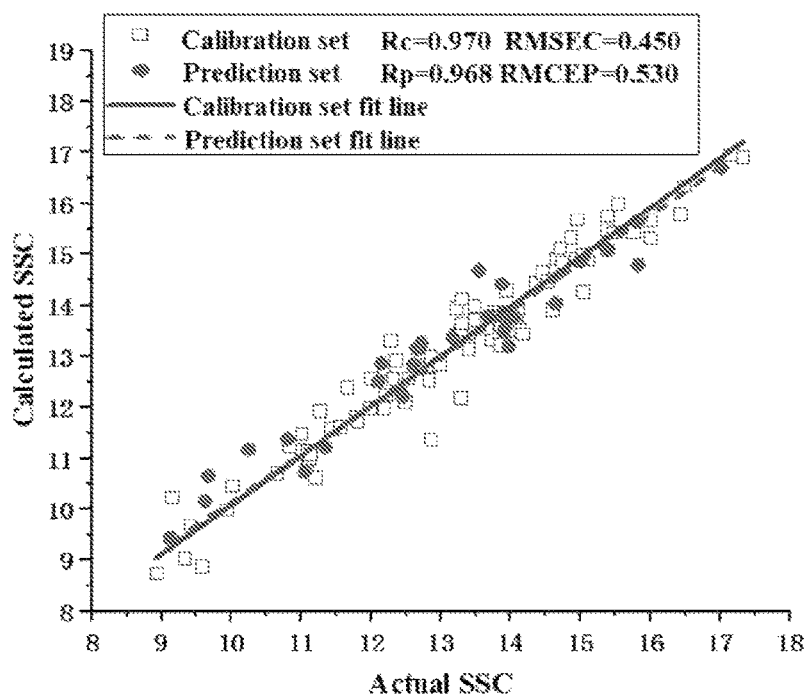
FIG. 11 is a scatter diagram of measured and predicted values of soluble solids in fruit in the internal quality inspection module of the fruit quality inspecting and sorting appliance in FIG. 1.

As shown in FIG. 6, in the technical solution of the embodiments, the internal quality inspection module 30 includes an internal quality inspection housing 31, a halogen lamp 32 and an optical fiber 33. The conveying module 10 passes through the internal quality inspection housing 31. The halogen lamp 32 is located above the side conveyor-belt structure 13. The optical fiber 33 is located below the side conveyor-belt structure 13 and is electrically connected with the control module. A light emitted by the halogen lamp 32 passes through the fruits, and the optical fiber 33 receives the light passing through the fruits. The optical fiber 33 is electrically connected with a spectrometer. The comparison between a preset spectrum in the control module and a spectrum of the spectrometer is shown in FIG. 11, so that a measured sugar content of fruit and other internal parameter information are obtained. The internal quality inspection housing 31 is a black box, which may effectively avoid an influence of external factors. There are two halogen lamps 32 and two optical fibers 33, which are set corresponding to the two side conveyor-belt structures 13.

Figure 7:
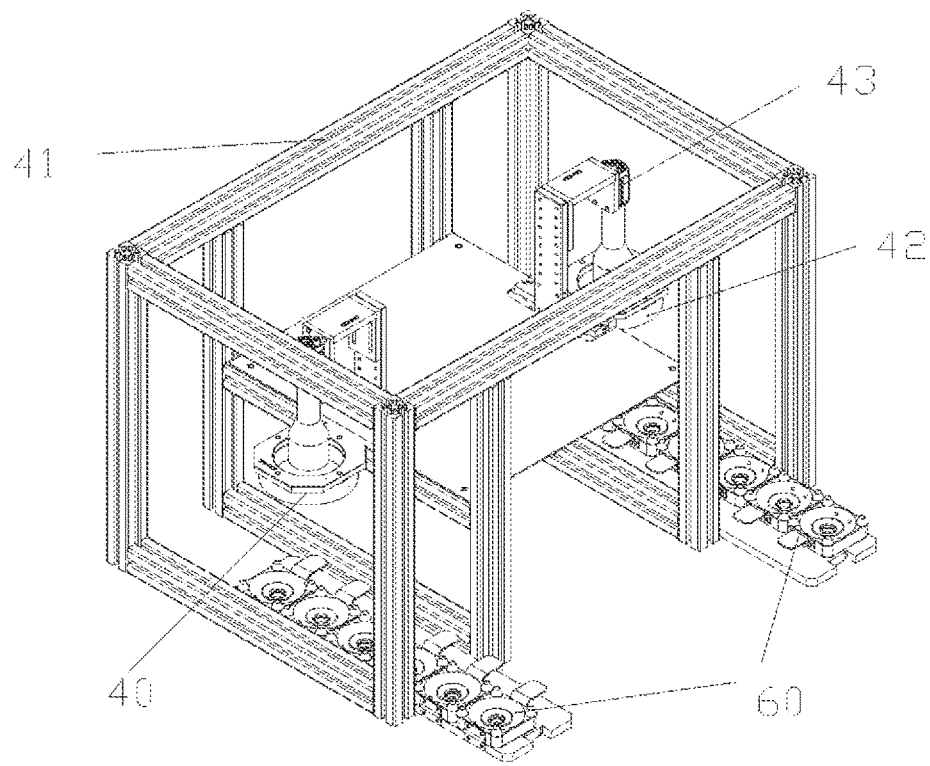
FIG. 7 is a structural schematic diagram of an external quality inspection module of the fruit quality inspecting and sorting appliance in FIG. 1.

As shown in FIG. 7, in the technical solution of the embodiments, the external quality inspection module 40 includes an external quality inspection housing 41, a fluorescent lamp 42 and a camera 43. The conveying module 10 passes through the external quality inspection housing 41. The fluorescent lamp 42 is located above the side conveyor-belt structure 13. The camera 43 is located above the side conveyor-belt structure. The above structure may realize the appearance inspection of fruits. In the technical solution of the embodiments, there are two fluorescent lamps 42 and two cameras 43, which are respectively located on the two side conveyor-belt structures 13.

Figure 8:
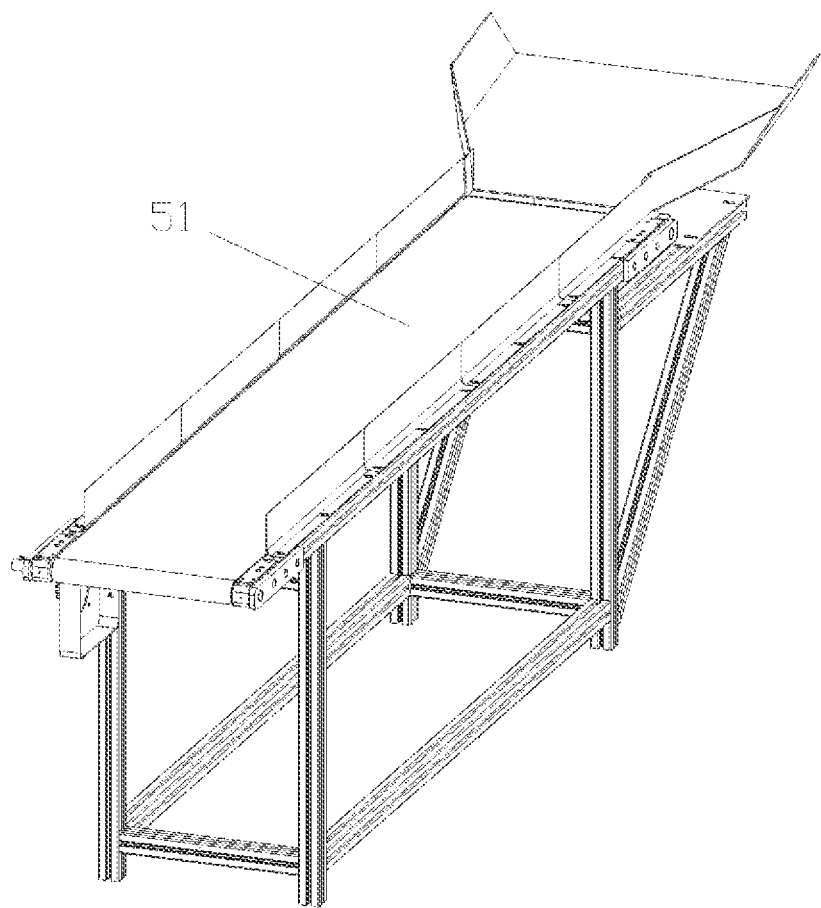
FIG. 8 is a structural schematic diagram of a sorting channel of the fruit quality inspecting and sorting appliance in FIG. 1.

As shown in FIG. 1 and FIG. 8, in the technical solution of some embodiments, the sorting module 50 includes a plurality of sorting channels 51 and a plurality of fruit unloading manipulators 52. The plurality of sorting channels 51 are arranged at intervals on a side, away from the middle conveyor-belt structure 12, of the side conveyor-belt structure 13. The plurality of fruit unloading manipulators 52 and the plurality of sorting channels 51 are arranged in one-to-one correspondence. The above structure realizes the automation of fruit sorting. The sorting channel 51 includes a tilting plate and a sorting conveyor belt. The fruits on the side conveyor-belt structure 13 enter the sorting conveyor belt through the tilting plate. The setting of the tilting plate may use gravity to reduce energy consumption. There are baffles arranged on both sides of the sorting conveyor belt.

Figure 9:
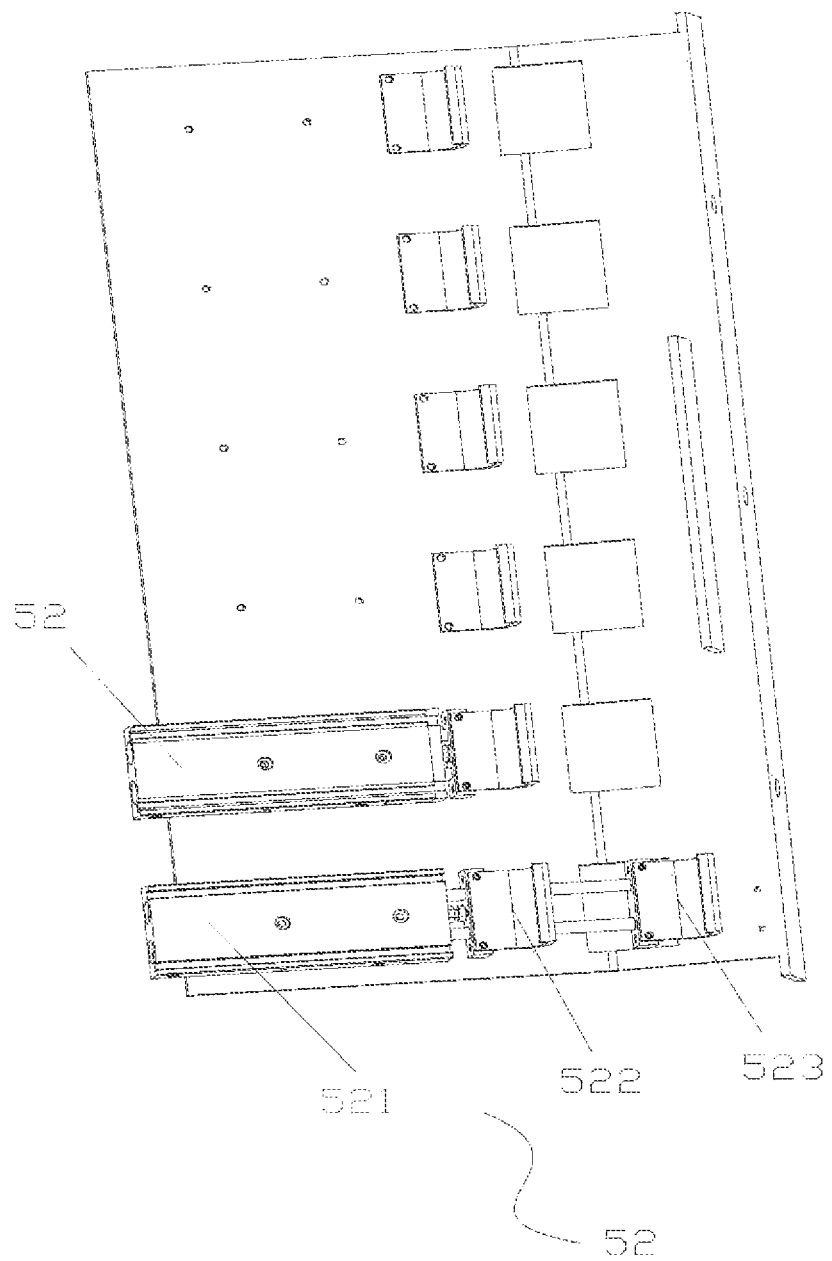
FIG. 9 is a structural schematic diagram of a fruit unloading manipulator of the fruit quality inspecting and sorting appliance in FIG. 1.

As shown in FIG. 9, in the technical solution of some embodiments, the fruit quality inspecting and sorting appliance includes a fruit cup structure 60. The fruit cup structure 60 includes a base 61, a fruit cup 62 and a fruit cup handle 63. A side, close to the sorting channel 51, of the fruit cup 62 is pivotally connected with the base 61 through a hinge. The fruit cup handle 63 is arranged on a side, away from the sorting channel 51, of the fruit cup 62. The fruit unloading manipulator 52 cooperates with the fruit cup handle 63 to flip the fruit cup 62. With the above structure, it is convenient to dump the fruits. There is a cushion in the fruit cup 62. There is a through hole in a middle part of the fruit cup 62, so that diffuse transmission light is received by the optical fiber 33 by the through hole.

As shown in FIG. 9, in the technical solution of the embodiments, the fruit unloading manipulator 52 includes a cylinder 521, a lifting plate 522 and a pressing plate 523. The lifting plate 522 and the pressing plate 523 are arranged at intervals on a moving rod of the cylinder 521. The lifting plate 522 is located at a lower part of the fruit cup handle 63. The pressing plate 523 is located at an upper part of the fruit cup handle 63. The above structure has low processing cost and convenient setting. The lifting plate 522 may lift the fruit cup handle 63, so that the fruit cup 62 is flipped at a certain angle and the fruit falls into the sorting channel 51. When the fruit cup 62 is not easy to return to an initial position under a force of gravity, the pressing plate 523 may play a role of returning the fruit cup 62 to the initial position.

Figure 10:
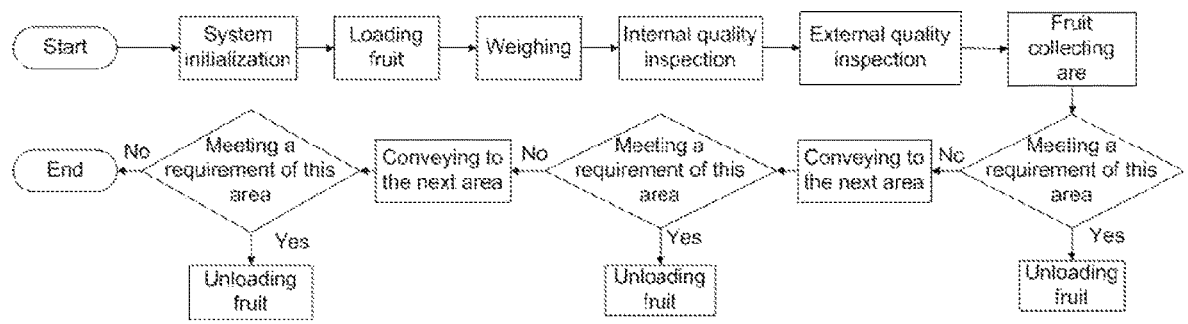
FIG. 10 is a working flowchart of the fruit quality inspecting and sorting appliance in FIG. 1.

As shown in FIG. 10, a working principle and process of fruit sorting in the embodiments are as follows: first, a start button is pressed to initialize the system; after the sorting is confirmed, a box loading belt (the first weighing loading conveyor belt and the second weighing loading conveyor belt) conveys a fruit box to a top of the belt; and the fruit box will be conveyed to an appropriate grasping position of a fruit box placing platform 214 under an action of a fruit box pushing cylinder 206. After a spacing between each two rows of apples in each layer and the number of apples to be grasped are set in an LCD (Liquid Crystal Display) touch screen 216, a spacing between tips of a first suction disc and a second suction disc is adjusted, and the number of layers to be grasped, the first suction disc is driven by a first suction disc motor to grasp the apples in the fruit box to the weighing fruit cup (the first weighing cup and the second weighing cup) with a weight sensor. After weighing the apples in the weighing cup, weight information of the apples will be fed back to a PC. The second suction disc is driven by the suction disc motor to grasp the weighed apples in the weighing fruit cup to the weighing fruit cup of the side conveyor-belt structure 13. With the conveying of the side conveyor-belt structure 13, the fruit cup 62 carrying the apples will be conveyed to the internal quality inspection module 30 of apple for collecting spectral information of internal quality, and the external quality inspection module 40 of apple collects external quality information of the apples. After these two parts of inspection, the obtained apple information will be sent to the PC. With the conveying of the side conveyor-belt structure 13, the apples will be conveyed to a fruit collecting area (the area where the sorting module 50 is located), at this point, a blocking part installed in a middle of the conveying module 10 will block the apple cup 62 with the apples. Under an action of a fruit unloading manipulator 52, by lifting the lifting plate 522 upward, the lifting plate 522 acts with the fruit cup handle 63 on the fruit cup 62 to lift the fruit cup 62 upward, after that, the apples that meet a sorting requirement will be put in one sorting channel 51; then, a fruit collecting conveyor belt in the sorting channel (fruit collecting channel) is driven by a fruit collecting conveyor belt motor to convey the sorted apples, and the sorting is completed. At this point, the apples that do not meet the sorting requirement on the fruit cup 62 will be conveyed to the next sorting channel 51, and the above process will be repeated. If there are apples that do not meet the sorting requirement in a penultimate sorting channel 51, then all the apples that do not meet the requirement will be lifted to the last sorting channel 51, so the sorting is completed. The fruit cup 62 after the sorting, which is at a tail part of the fruit quality inspecting and sorting appliance, is completed will be pushed to the middle conveyor-belt structure 12. The middle conveyor-belt structure 12 will convey the empty fruit cup 62 to an end of the fruit quality inspecting and sorting appliance. At the end of the fruit quality inspecting and sorting appliance, the fruit cup 62 will be pushed to the side conveyor-belt structure 13 again to complete a cycle. In this way, one time of sorting is completed.

FIG. 11 is a scatter diagram of measured and predicted values of soluble solids (sugar content) in apples established by an embodiment. The internal quality inspection module 30 collects internal spectral information of apple. After the spectrum collection of an apple is completed, the pulp of an apple collection surface is cut and juiced to facilitate the measurement of a true value of apple, and apple juice is filtered with a piece of filter paper. The filtered apple juice is dropped onto a measuring window of a portable digital display refractometer to measure the soluble solids (sugar content) in the apple. Each measurement is repeated three times, and an average value is taken as an experimental value of sugar content, which is expressed as mass fraction. In the embodiments, the following method is used for modeling. First, the Unscrambler software is used for data preprocessing and modeling, and the performance of model is established by using an original spectrum. Correlation coefficients of a calibration set and a prediction set are Rc equal to 0.979 and Rp equal to 0.959, respectively, and root mean square errors are RMSEC equal to 0.376 and RMSEP equal 0.559, respectively. A better preprocessing result is obtained by using SG smoothing algorithm. The SG smoothing algorithm may be specially used for eliminating random noises in a spectrum signal. The performance of model is established by using SG. The correlation coefficients of the calibration set and the prediction set are Rc equal to 0.971 and Rp equal to 0.959, respectively, and the root mean square errors are RMSEC equal to 0.443 and RMSEP equal 0.559, respectively. Finally, CARS was used for variable selection. A CARS variable selection method may effectively simplify a prediction model and improve the prediction accuracy of the model. A Partial Least Squares (PLS) method is used for establishing a calibration model for 90 samples. The calibration model is used to predict the remaining 30 validation set samples. A modeling effect and a prediction effect are shown in FIG. 11 respectively. The scatter diagram is drawn by Origin 2017. The correlation coefficients of the calibration set and the prediction set are Rc equal to 0.970 and Rp equal to 0.969, respectively, and the root mean square errors of the calibration set and the prediction set are RMSEC equal to 0.450 and RMSEP equal 0.530, respectively. It can be seen that the prediction result of the scheme is relatively ideal, which indicates that some embodiments of the disclosure have strong ability to predict the sugar content of apples.

It is to be noted that terms used herein are only to describe specific embodiments, and are not intended to limit the exemplary embodiments of the disclosure. As used herein, unless otherwise explicitly indicated in the context, a singular form is also intended to include a plural form. In addition, it is also to be understood that when the terms "include" and/or "have" are used in the description, they are intended to indicate the presence of features, steps, operations, devices, components, and/or combinations thereof.

It should be noted that the specification and claims of the disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

The above is only the preferred embodiments of the present disclosure and not intended to limit the present disclosure; for those skilled in the art, the present disclosure may have various modifications and changes. Any modifications, equivalent replacements, improvements and the like within the spirit and principle of the present disclosure should fall within the protection scope of the claims of the present disclosure.

What is claimed is:

1. A fruit quality inspecting and sorting appliance, comprising:
    a conveying module;
    a weighing module, which cooperates with the conveying module to convey weighed fruits through the conveying module;
    an internal quality inspection module, which cooperates with the conveying module and performs an internal quality inspection to the weighed fruits;
    an external quality inspection module, which cooperates with the conveying module and performs an external quality inspection to the fruits after the internal quality inspection;
    a sorting module, wherein the sorting module cooperates with the conveying module, and sorts the fruits passing through the weighing module, the internal quality inspection module and the external quality inspection module; and a control module, wherein the control module is electrically connected with the conveying module, the weighing module, the internal quality inspection module, the external quality inspection module and the sorting module respectively, and is configured to control the sorting module to sort the fruits according to an inspection result of the fruit;

wherein the conveying module comprises a support structure, a middle conveyor-belt structure and two side conveyor-belt structures; wherein the middle conveyor-belt structure is arranged on the support structure; the two side conveyor-belt structures are located on the support structure and on two sides of the middle conveyor-belt structure; and a conveying direction of the two side conveyor-belt structures is opposite to a conveying direction of the middle conveyor-belt structure.

2. The fruit quality inspecting and sorting appliance as claimed in claim 1, wherein the weighing module comprises a weighing support, a first weighing main body structure and a second weighing main body structure; wherein the first weighing main body structure and the second weighing main body structure are arranged on the weighing support; the weighing support spans a first end of the conveying module; and the first weighing main body structure and the second weighing main body structure are the same and symmetrically arranged on two sides of the conveying module.

3. The fruit quality inspecting and sorting appliance as claimed in claim 2, wherein the first weighing main body structure comprises a first weighing loading conveyor belt, a first weighing grasping manipulator and a first weighing cup; the first weighing loading conveyor belt, the first weighing grabbing manipulator and the first weighing cup are all arranged on the weighing support; the first weighing grasping manipulator comprises a first moving structure and a first fruit suction disc structure, and the first fruit suction disc structure is arranged on the first moving structure.

4. The fruit quality inspecting and sorting appliance as claimed in claim 3, wherein the fruit suction disc structure comprises a negative pressure suction device and a plurality of suction discs; the plurality of suction discs are arranged on the moving structure at intervals and connected with the negative pressure suction device.

5. The fruit quality inspecting and sorting appliance as claimed in claim 3, wherein the first weighing main body structure also comprises a first box pushing and pulling structure, a first separator suction disc structure, a first discharging conveyor belt and a first box pushing structure; the first box pushing and pulling structure is arranged on the weighing support and is configured to drive a fruit box to move along a moving direction of the side conveyor-belt structure; the first separator suction disc structure is arranged on the weighing support and is configured to grasp a separator in the fruit box; and the first box pushing structure is arranged corresponding to the first discharging conveyor belt.

6. The fruit quality inspecting and sorting appliance as claimed in claim 1, wherein the internal quality inspection module comprises an internal quality inspection housing, a halogen lamp and an optical fiber; wherein the conveying module passes through the internal quality inspection housing, the halogen lamp is located above the side conveyor-belt structure, and the optical fiber is located below the side conveyor-belt structure and is electrically connected with the control module.

7. The fruit quality inspecting and sorting appliance as claimed in claim 1, wherein the external quality inspection module comprises an external quality inspection housing, a fluorescent lamp and a camera; wherein the conveying module passes through the external quality inspection housing, the fluorescent lamp is located above the side conveyor-belt structure, and the camera is located above the side conveyor-belt structure.

8. The fruit quality inspecting and sorting appliance as claimed in claim 1, wherein the sorting module comprises a plurality of sorting channels and a plurality of fruit unloading manipulators; wherein the plurality of sorting channels are arranged at intervals on a side, away from the middle conveyor-belt structure, of each side conveyor-belt structure; and the plurality of fruit unloading manipulators and the plurality of sorting channels are arranged in one-to-one correspondence.

9. The fruit quality inspecting and sorting appliance as claimed in claim 8, comprising a fruit cup structure; the fruit cup structure comprises a base, a fruit cup and a fruit cup handle; a side, close to the plurality of sorting channels, of the fruit cup is pivotally connected with the base by a hinge; the fruit cup handle is arranged on a side, away from the plurality of sorting channels, of the fruit cup; and the fruit unloading manipulator is cooperated with the fruit cup handle to flip the fruit cup.

10. The fruit quality inspecting and sorting appliance as claimed in claim 9, wherein the fruit unloading manipulator comprises a cylinder, a lifting plate and a pressing plate; wherein the lifting plate and the pressing plate are arranged at intervals on a moving rod of the cylinder; the lifting plate is located at a lower part of the fruit cup handle; and the pressing plate is located at an upper part of the fruit cup handle.

* * * * *